(12) United States Patent
Zhang et al.

(10) Patent No.: US 12,356,083 B2
(45) Date of Patent: Jul. 8, 2025

(54) TECHNIQUES FOR CORRECTING IMAGES IN FLASH PHOTOGRAPHY

(71) Applicant: Apple Inc., Cupertino, CA (US)

(72) Inventors: Bosheng Zhang, Sunnyvale, CA (US); Tobias Baldauf, Newmarket (GB); Ilya Romanenko, Foxton (GB); Nicolas P. Bonnier, Mountain View, CA (US); Noah D. Bedard, Los Gatos, CA (US); Alexandra S. Ludlow, Cambridge (GB); Graham D. Finlayson, Norwich (GB); Jason P. de Villiers, Cambridge (GB); Claus Moelgaard, Los Gatos, CA (US); Hau Ling Hung, San Jose, CA (US); Paul M. Hubel, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 519 days.

(21) Appl. No.: 17/950,859

(22) Filed: Sep. 22, 2022

(65) Prior Publication Data

US 2024/0107177 A1    Mar. 28, 2024

(51) Int. Cl.
    *H04N 5/243*    (2006.01)
    *G06T 5/50*    (2006.01)
    (Continued)

(52) U.S. Cl.
    CPC ............ *H04N 23/76* (2023.01); *G06T 5/50* (2013.01); *G06T 7/50* (2017.01); *H04N 9/73* (2013.01); *G06T 2207/20221* (2013.01)

(58) Field of Classification Search
    CPC ........ H04N 23/76; H04N 9/73; H04N 23/741; H04N 23/951; H04N 23/74; G06T 5/50;
    (Continued)

(56) References Cited

U.S. PATENT DOCUMENTS 7,551,797 B2    6/2009    Dorrell et al.
7,590,344 B2    9/2009    Petschnigg
(Continued)

FOREIGN PATENT DOCUMENTS

WO    WO-2015151748 A1  *  10/2015    ........... H04N 5/2351

OTHER PUBLICATIONS

Georg Petschnigg et al., "Digital Photography with Flash and No-Flash Image Pairs" pub 2004 (Year: 2004).*

*Primary Examiner* — Mekonen T Bekele
(74) *Attorney, Agent, or Firm* — Brownstein Hyatt Farber Schreck, LLP

(57) ABSTRACT

Embodiments disclosed herein are directed to devices and methods for performing spatially-varying brightness correction of a flash image. The spatially-varying brightness correction utilizes a set of images that includes one or more images captured under flash illumination and one or more images captured without flash illumination, which are used to decompose one of the flash images or an image generated therefrom into a flash contribution image and an ambient contribution image. The flash contribution image and the ambient contribution image are recombined to generate a corrected flash image, and information about the flash module and/or scene is used to adjust the relative contributions of these images during recombination.

22 Claims, 7 Drawing Sheets

(51) Int. Cl.
*G06T 7/50* (2017.01)
*H04N 9/73* (2023.01)
*H04N 23/76* (2023.01)

(58) Field of Classification Search
CPC ............. G06T 7/50; G06T 2207/20221; G06T 2207/10024; G06T 2207/10144; G06T 2207/10152; G06T 5/94
See application file for complete search history.

(56) References Cited

U.S. PATENT DOCUMENTS 8,018,525 B2  9/2011  Trevelyan et al.
9,571,818 B2  2/2017  Pulli et al.

* cited by examiner

TECHNIQUES FOR CORRECTING IMAGES IN FLASH PHOTOGRAPHY

FIELD

The described embodiments relate generally to correcting images captured under flash illumination, and more particularly for performing spatially-varying brightness adjustments while correcting images captured under flash illumination.

BACKGROUND

Cameras continue to be an important feature of consumer electronics devices such as smartphones, tablets, and computers. The imaging capabilities of these consumer electronics devices have steadily increased as individual cameras have improved in quality and devices have started integrating multiple-camera ("multi-camera") systems and depth sensors, allowing users to capture high quality images in an ever-increasing range of situations. In low light conditions, a flash module may be used to illuminate a scene to facilitate image capture. In order to fit in a consumer electronic device, many flash modules are relatively small and positioned close to cameras of the device, which can result in uneven illumination depending on the content of the scene being imaged. Accordingly, it may be desirable to correct or otherwise account for illumination variations provided by a flash module.

SUMMARY

Embodiments described herein are directed to systems, devices, and methods for performing spatially-varying brightness correction of a flash image. Some embodiments are directed to an image processing method that includes obtaining a set of images from a set of cameras, the set of images comprising a set of flash images, generating a fused flash image from two or more flash images of the set of flash images, and decomposing the fused flash image using a reference image to generate a flash contribution image and an ambient contribution image. The method further includes performing a spatially-varying brightness adjustment to the flash contribution image, and recombining the brightness-adjusted flash contribution image and the ambient contribution image to generate a corrected flash image.

In some instances, the method includes selecting a source image, and using a style transfer operation to generate an output image from the corrected flash image and the source image. In some of these variations, the source image is the fused flash image. Additionally or alternatively, the set of images comprises a set of ambient images, and the reference image is selected or generated from the set of ambient images. In other variations, the set of images comprises a set of pre-flash images, and the reference image is selected or generated from the set of pre-flash images.

Performing the spatially-varying brightness adjustment may include spatially adjusting the brightness of the flash contribution image using a depth map. Additionally or alternatively, performing the spatially-varying brightness adjustment includes spatially adjusting the brightness of the flash contribution image using a reflectivity map. Additionally or alternatively, performing the spatially-varying brightness adjustment includes spatially adjusting the brightness of the flash contribution image using a flash illumination profile. Additionally or alternatively, performing the spatially-varying brightness adjustment includes spatially adjusting the brightness of the flash contribution image using contextual information about a scene captured by the set of images. In other variations, the method includes performing a first white balancing operation to color correct the flash contribution image and performing a second white balancing operation to color correct the ambient contribution image. In some of these variations, the second white balancing operation uses the color-corrected flash contribution image to generate an ambient color correction map.

Other embodiments are directed to a device that includes a set of cameras, a flash module, a memory, and one or more processors operatively coupled to the memory. The one or more processors are configured to execute instructions causing the one or more processors to obtain a set of images from the set of cameras, the set of images comprising a set of flash images, obtain a depth map, select or generate a reference image from the set of images, and select or generate an input image from the set of flash images. The instructions cause the one or more processors to decompose the input image using the reference image to generate a flash contribution image and an ambient contribution image, perform a spatially-varying brightness adjustment to the flash contribution image using the depth map, and recombine the brightness-adjusted flash contribution image and the ambient contribution image to generate a corrected flash image.

In some variations, the device includes a depth sensor, and obtaining the depth map includes deriving the depth map from depth information generated by the depth sensors. In other variations, performing the spatially-varying brightness adjustment includes performing the spatially-varying adjustment using a flash illumination profile associated with the flash module. Additionally or alternatively, performing the spatially-varying brightness adjustment includes spatially adjusting the brightness of the flash contribution image using contextual information about a scene captured by the set of images. In some of these instances, the flash illumination profile is selected from a set of candidate flash illumination profiles. In other variations, the set of images comprises a set of ambient images, and the reference image is selected or generated from the set of ambient images.

Still other embodiments are directed to a device that includes a set of cameras, a flash module, a memory, and one or more processors operatively coupled to the memory, wherein the one or more processors are configured to execute instructions causing the one or more processors to obtain a set of images from the set of cameras, the set of images comprising a set of flash images, select or generate a input image from the set of flash images, select or generate a reference image from the set of images, and decompose the input image using the reference image to generate a flash contribution image and an ambient contribution image. The instructions cause the one or more processors to perform a spatially-varying brightness adjustment to the flash contribution image using a reflectivity map, and recombine the brightness-adjusted flash contribution image and the ambient contribution image to generate a corrected flash image.

In some of these variations, the instructions cause the one or more processors to obtain a depth map, and generate the reflectivity map using the flash contribution image and the depth map. In some of these variations, generating the reflectivity map includes generating the reflectivity map using a flash illumination profile associated with the flash module. In other variations, the input image is a fused flash image generated from two or more flash images of the set of flash images. Additionally or alternatively, the one or more processors are configured to execute instructions causing the one or more processors to down sample the input image.

In addition to the example aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

It should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments disclosed herein are directed to devices and methods for performing spatially-varying brightness correction of a flash image. The spatially-varying brightness correction utilizes a set of images that includes one or more images captured under flash illumination and one or more images captured without flash illumination, which are used to decompose one of the flash images (or an image generated therefrom) into a flash contribution image and an ambient contribution image. The flash contribution image and the ambient contribution image are recombined to generate a corrected flash image, and information about the flash module and/or scene is used to adjust the relative contributions of these images during recombination.

These and other embodiments are discussed below with reference to FIGS. 1A-5. However, those skilled in the art will readily appreciate that the detailed description given herein with respect to these Figures is for explanatory purposes only and should not be construed as limiting.

Figure 1A:
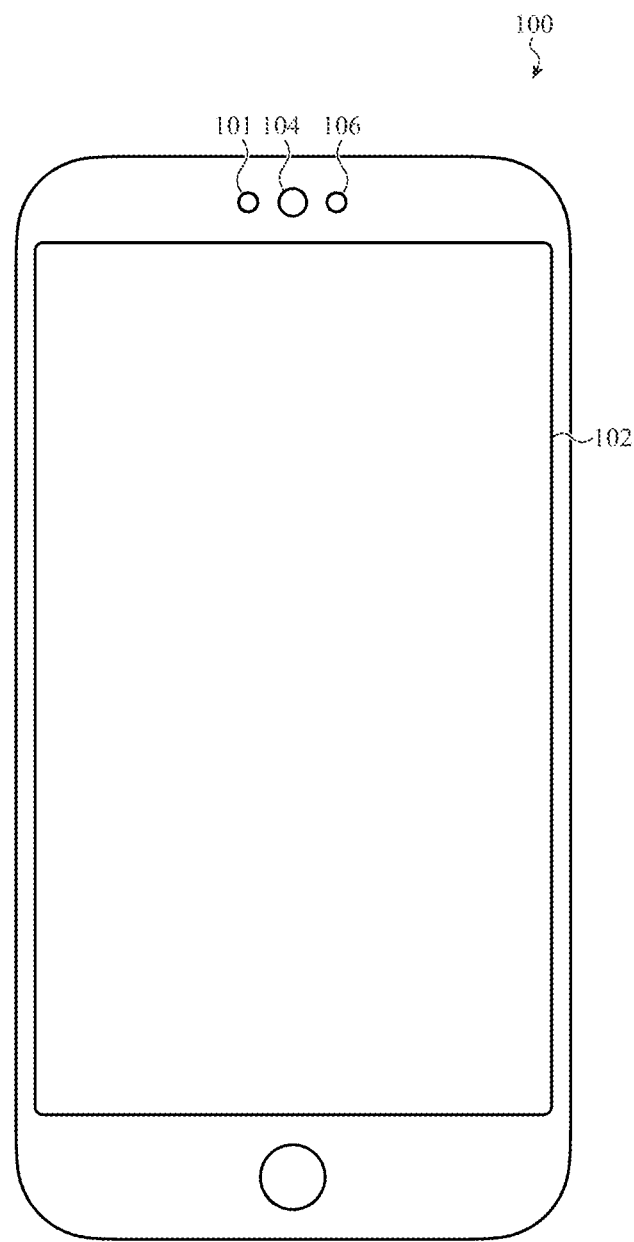
FIGS. 1A and 1B show front and rear views, respectively, of an example of an electronic device having a camera and a flash module.
Figure 1B:
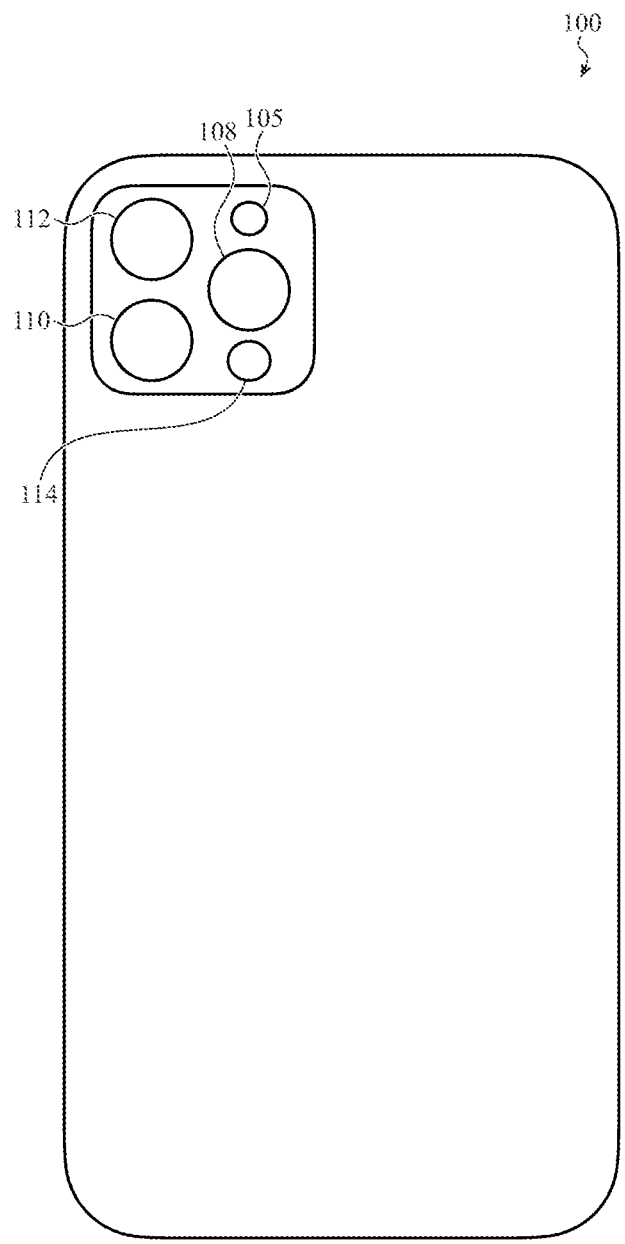
Figure 1C:
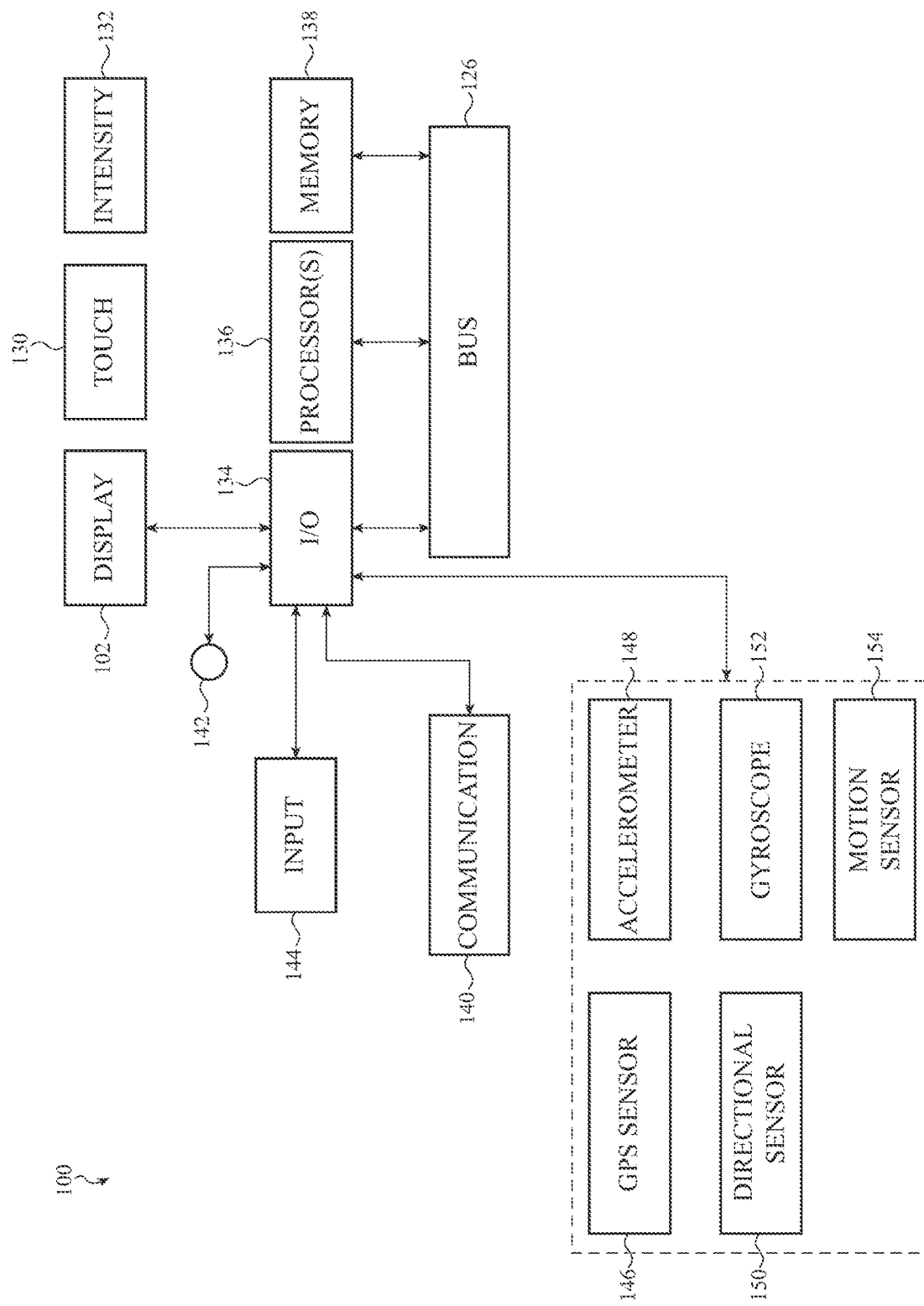
FIG. 1C depicts exemplary components of the device of FIGS. 1A and 1B.

The devices, methods, and non-transitory program storage devices described here utilize images of a scene captured by a camera, at least a subset of which are captured while a flash module provides illumination to the scene. FIGS. 1A-1C depict an example device 100 as described herein that may be used to capture the images utilized by the devices, methods, and non-transitory program storage devices described herein. FIG. 1A shows a front view of the device 100, which includes a display 102, a front-facing flash module 101, and a front-facing camera 104. The display 102 may provide a graphical output that is viewable through or at a front exterior surface of the device 100. The front-facing camera 104 is positioned to view a portion of the environment in front of the display 102 (i.e., the "field of view", which is the spatial extent of a scene that a camera is able to capture using an image sensor of the camera). Similarly, the front-facing flash module 101 may illuminate a portion of the environment in front of the display 102 (i.e., the "field of illumination" of the front-facing flash module 101). The field of illumination of the front-facing flash module 101 at least partially overlaps the field of view of the front-facing camera 104, which allows the front-facing flash module 101 to illuminate the camera's field of view during image capture.

In some instances, the device 100 may further include a front-facing depth sensor 106 that may calculate depth information for a portion of the environment in front of the device 100. Specifically, the front-facing depth sensor 106 may calculate depth information within a field of coverage (i.e., the widest lateral extent to which the depth sensor is capable of providing depth information). The field of coverage of the front-facing depth sensor 106 may at least partially overlap the field of illumination of the front-facing flash module 101, thereby allowing the front-facing depth sensor 106 to calculate depth information associated with the field of illumination of the front-facing flash module 101. The front-facing depth sensor 106 may be any suitable system that is capable of calculating the distance between the front-facing depth sensor 106 and various points in the environment around the device 100. Information from the depth sensor may be used to generate a depth map as described herein.

The depth information may be calculated in any suitable manner. In one non-limiting example, a depth sensor may utilize stereo imaging, in which two images are taken from different positions, and the distance (disparity) between corresponding pixels in the two images may be used to calculate depth information. In another example, a depth sensor may utilize structured light imaging, whereby the depth sensor may image a scene while projecting a known pattern (typically using infrared illumination) toward the scene, and then may look at how the pattern is distorted by the scene to calculate depth information. In still another example, a depth sensor may utilize time of flight sensing, which calculates depth based on the amount of time it takes for light (typically infrared) emitted from the depth sensor to return from the scene. A time-of-flight depth sensor may utilize direct time of flight or indirect time of flight, and may illuminate an entire field of coverage at one time, or may only illuminate a subset of the field of coverage at a given time (e.g., via one or more spots, stripes, or other patterns that may either be fixed or may be scanned across the field of coverage). In instances where a depth sensor utilizes infrared illumination, this infrared illumination may be utilized in a range of ambient conditions without being perceived by a user.

FIG. 1B shows a rear view of the device 100, which includes a set of rear-facing cameras and a rear-facing flash module 105. In the variation shown in FIG. 1B, the set of rear-facing cameras includes a first rear-facing camera 108, a second rear-facing camera 110, and a third rear-facing camera 112. The rear-facing cameras may have fields of view that at least partially overlap with each other, which may allow the rear-facing cameras to capture different aspects of a scene facing a rear surface of the device 100. For example, in some instances each rear-facing camera has a different focal length, and thereby has a corresponding field of view with a different size. The choice of the size of a camera's field of view may impact the situations in which a particular camera may be useful. For example, cameras with longer focal lengths (and narrower fields of view) are often used in telephoto imaging where it is desirable to increase the magnification of a subject at farther distances, while cameras with shorter focal lengths (and wider fields of view) are often used in instances where it is desirable to capture more of a scene (e.g., landscape photography).

The field of illumination of the rear-facing flash module 105 at least partially overlaps the fields of view for some or all of the rear-facing cameras (e.g., any or all of the first rear-facing camera 108, the second rear-facing camera 110, and the third rear-facing camera 112). To the extent that the field of illumination of the rear-facing flash module 105 overlaps with a corresponding field of view of one of these cameras, the rear-facing flash module 105 may illuminate that camera's field of view during image capture.

Also shown there is a rear-facing depth sensor 114, which may be configured in any manner as discussed previously with respect to the front-facing depth sensor 106. A field of coverage of the rear-facing depth sensor 114 may at least partially overlap the field of illumination of the rear-facing flash module 105, thereby allowing the rear-facing depth sensor 114 to calculate depth information associated with the field of illumination of the rear-facing flash module 105. The field of coverage of the rear-facing depth sensor 114 may also overlap the fields of view for some or all of the rear-facing cameras discussed above.

While the device 100 is shown in FIGS. 1A and 1B as having two flash modules, four cameras, and two depth sensors, it should be appreciated that the device 100 may have any number of cameras and flash modules as desired. The principles described herein may be applied to any flash module (or modules), camera (or cameras), and depth sensor (or depth sensors) of the device 100. For the purpose of illustration, the principles of operation described herein are described with respect to a single camera and an associated flash module, which may represent any camera of that device (e.g., a front-facing camera, a rear-facing camera, or the like).

In some embodiments, the device 100 is a portable multifunction electronic device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer, which may have a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system (e.g., display 102). In some embodiments, the display generation component is separate from the computer system. As used herein, "displaying" content includes causing to display the content by transmitting, via a wired or wireless connection, data (e.g., image data or video data) to an integrated or external display generation component to visually produce the content.

FIG. 1C depicts exemplary components of device 100. In some embodiments, device 100 has a bus 126 that operatively couples I/O section 134 with one or more computer processors 136 and memory 138. I/O section 134 can be connected to display 102, which can have touch-sensitive component 130 and, optionally, intensity sensor 132 (e.g., contact intensity sensor). In addition, I/O section 134 can be connected with communication unit 140 for receiving application and operating system data, using Wi-Fi, Bluetooth, near field communication (NFC), cellular, and/or other wireless communication techniques. Device 100 can include input mechanisms 142 and/or 144. Input mechanism 142 is, optionally, a rotatable input device or a depressible and rotatable input device, for example. Input mechanism 142 is, optionally, a button, in some examples. Device 100 optionally includes various sensors, such as GPS sensor 146, accelerometer 148, directional sensor 150 (e.g., compass), gyroscope 152, motion sensor 154, and/or a combination thereof, all of which can be operatively connected to I/O section 134. Some of these sensors, such as accelerometer 148 and gyroscope 152 may assist in determining an orientation of the device 100 or a portion thereof.

Memory 138 of device 100 can include one or more non-transitory computer-readable storage devices, for storing computer-executable instructions, which, when executed by one or more computer processors 136, for example, can cause the computer processors to perform the techniques that are described here (methods performed by the flash controllers described below). A computer-readable storage device can be any medium that can tangibly contain or store computer-executable instructions for use by or in connection with the instruction execution system, apparatus, or device. In some examples, the storage device is a transitory computer-readable storage medium. In some examples, the storage device is a non-transitory computer-readable storage medium. The non-transitory computer-readable storage device can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

The processor 136 can include, for example, a processor, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute an operating system and applications of device 100, as well as to facilitate capturing and processing of images as described herein. Device 100 is not limited to the components and configuration of FIG. 1C, but can include other or additional components in multiple configurations.

Accordingly, any of the processes described herein may be stored as instructions on a non-transitory computer-readable storage device, such that a processor may utilize these instructions to perform the various steps of the processes described herein. Similarly, the devices described herein include a memory (e.g., memory 138) and one or more processors (e.g., processor 136) operatively coupled to the memory. The one or more processors may receive instructions from the memory and are configured to execute these instructions to perform the various steps of the processes described herein.

Generally, the processes described herein include obtaining a set of images from one or more cameras, where the set of images includes at least a set of flash images and a set of ambient images, and using the first of images to generate a corrected flash image. As used herein, a "flash image" or a "pre-flash image" is an image of a scene captured by a camera (e.g., one of the cameras of device 100 described with respect to FIGS. 1A-1C) while the scene is actively being illuminated by a flash module (e.g., one of the flash modules of device 100 described with respect to FIGS. 1A-1C). Conversely, an "ambient image" as used herein is an image of a scene captured by a camera of a device while the scene is not actively being illuminated by a flash module of the device. In instances where a camera has a rolling shutter image sensor such that one side of an image frame is recorded slightly earlier than an opposite side of the image frame, it may be possible that a first region of an image is captured while the scene is not actively illuminated by a flash module and a second region of the image is captured while the scene is actively illuminated by the flash module. These images are referred to herein as "transition images."

As least some of the set of images are captured during a media capture event. Specifically, the camera (or multiple cameras) may be used to capture images during one or more photography modes (e.g., a photo mode that can capture still images, a video mode that may capture videos, a panoramic mode that can capture a panoramic photo, a portrait mode that can capture a still photo having an artificial bokeh applied, or the like). In general, during these modes, the device may display (e.g., via the display 102 of the device 100 of FIGS. 1A-1C) a camera user interface that displays a "live preview." The live preview is a stream of images captured by a camera of the multi-camera system and represents the field of view (which may be a subset of the field of view of the camera) that will be captured when the camera initiates a media capture event. In other words, the live preview allows a user to see what portion of the scene is currently being imaged and to decide when to capture a photo or video. In some instances, the live preview displays images captured by one camera of a device, but one or more different cameras of the device capture images during the media capture event.

When the camera initiates a media capture event, the camera will capture media depending on the current camera mode (e.g., capture a photo when in a photo mode or capture a video when in a video mode), which may then be stored locally on the device 100 or transmitted to a remote server for storage. It should be appreciated that in some instances there may be a frame buffer of images captured by a camera, and that some images that were collected before the initiation of the media capture event may be used in generating the captured media that is stored or transmitted.

A media capture event may be initiated when the camera receives a capture request. The capture request may be received under some predetermined conditions (e.g., a software application running on the device may, with appropriate user permissions, automatically request that the camera initiate a media capture event when certain criteria are met) or when a user gives a command to initiate the media capture event command by interacting with a shutter control on the user interface, pressing a designated button on the device, giving a voice command, or the like.

Figure 2:
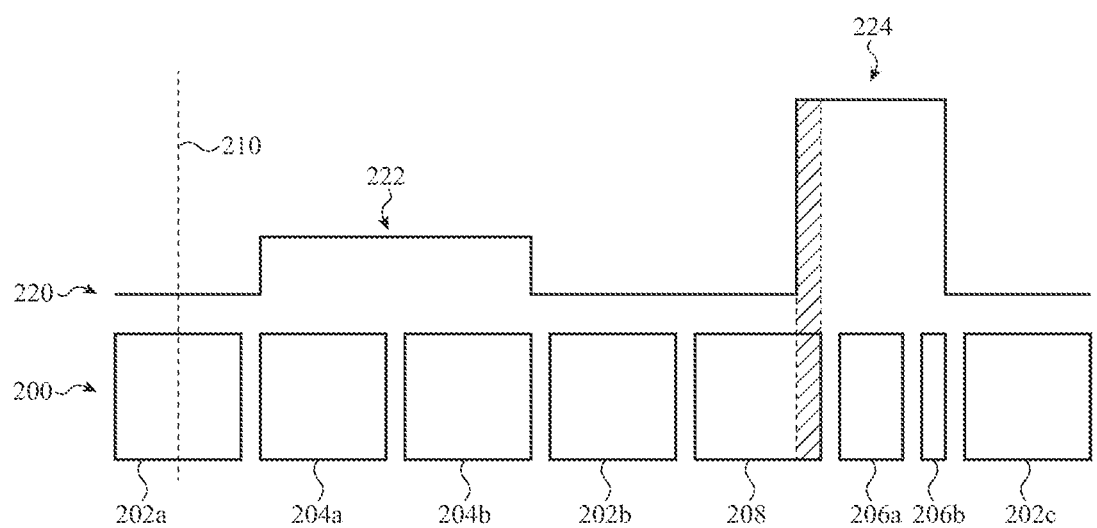
FIG. 2 shows an example of an image stream and associated flash illumination levels.

The processes described herein may be used when the device is in a flash photography mode, which is a photo mode in which the camera will generate an output image using images captured during flash illumination. Specifically, the camera (or multiple cameras) will capture a set of images that includes at least a set of flash images and a set of ambient images, where at least some of the images are captured after a capture request. For example, FIG. 2 shows an example image stream 200 that includes a sequence of images of a scene that are captured by a camera of a device following a capture request 210, as well as a flash intensity level 220 that represents the amount of illumination provided by a flash module of the device to the scene as a function of time.

As shown, the capture request 210 is received during the capture of a first ambient image 202a. In some variations, a pre-flash phase follows the capture request 210. In these variations, the flash module provides illumination to the scene at a first illumination level 222 while capturing a set of pre-flash images. A first pre-flash image 204a and a second pre-flash image 204b are shown in FIG. 2, though it should be appreciated that any number of pre-flash images may be captured during the pre-flash phase. The pre-flash images may be used for metering of one or more subsequent images, such as setting a second illumination level 224 of the flash module for a main flash phase. Additionally, in some instances the set of images used by the processes described herein may utilize one or more pre-flash images as described in more detail below. In variations in which a pre-flash phase follows the capture request 210, the image stream 200 may optionally include a set of ambient images (not shown) captured between the capture request 210 and the pre-flash phase.

A main flash phase follows the capture request 210. One or more ambient images may be captured between the capture request 210 and the main flash phase. For example, a second ambient image 202b is shown in FIG. 2 as being captured between the capture request 210 and the main flash phase. In other embodiments, multiple ambient images may be captured between the capture request 210 and the main flash phase. In instances where the media capture event includes a pre-flash phase, a set of ambient images may be captured between the pre-flash phase and the main flash phase. For example, the second ambient image 202b is captured between the pre-flash phase and the main flash phase.

During the main flash phase, the camera captures a set of flash images while illuminating the scene at the second illumination level 224. In instances where the image sequence includes a pre-flash phase, the second illumination level 224 may be selected using information derived from the set of pre-flash images. The set of flash images includes a first flash image 206a and a second flash image 206b in the example shown in FIG. 2, though it should be appreciated that in other instances a single flash image or three or more flash images are captured during the main flash phase. When the set of flash images includes multiple flash images, it may be desirable for these flash images to be captured using different exposure times. For example, the first flash image 206a may have a longer exposure time than the second flash image 206b (these flash images may be captured in any order as may be desired). Having different exposure times allow the processes described herein to generate a fused flash image that has a wider dynamic range than the individual flash images.

The number of flash images captured during the main flash phase and their respective exposure times may be fixed, or may be dynamically determined based on the scene that is being imaged (e.g., determined using one or more ambient and/or pre-flash images captured before the main flash phase, and/or depth information captured by a depth sensor of the device). For example, the process may include determining one or more scene characteristics (e.g., using one or more captured images and/or captured depth information), such as the amount of ambient illumination as well as the number, size, reflectivity, and/or position of objects present in the scene. The determined scene characteristics may be used to select the number of flash images captured during the main flash phase. Additionally or alternatively, the determined scene characteristics may be used to set the relative exposure times of the flash images captured during the main flash phase.

In some instances, the main flash phase also includes a transition image 208 captured during the start of the main flash phase (i.e., before the set of flash images is captured). In these instances, the flash module may begin illuminating the scene during capture of the transition image 208, which may give the flash module sufficient time to increase its emitted illumination up to the second illumination level 224 before the camera starts capturing the set of flash images. This allows the flash module to emit consistent illumination while the camera captures the set of flash images. The transition image 208 may be discarded, or may be used by the processes described herein (e.g., to assist with image registration).

Additionally, in some instances the image stream 200 includes one or more ambient images (e.g., a third ambient image 202c) captured after the main flash phase. Collectively, some or all of the ambient images, pre-flash images, and flash images captured after the capture request 210, and optionally one or more other images captured before the capture request 210, form the set of images used to generate a corrected flash image as described herein.

Figure 3:
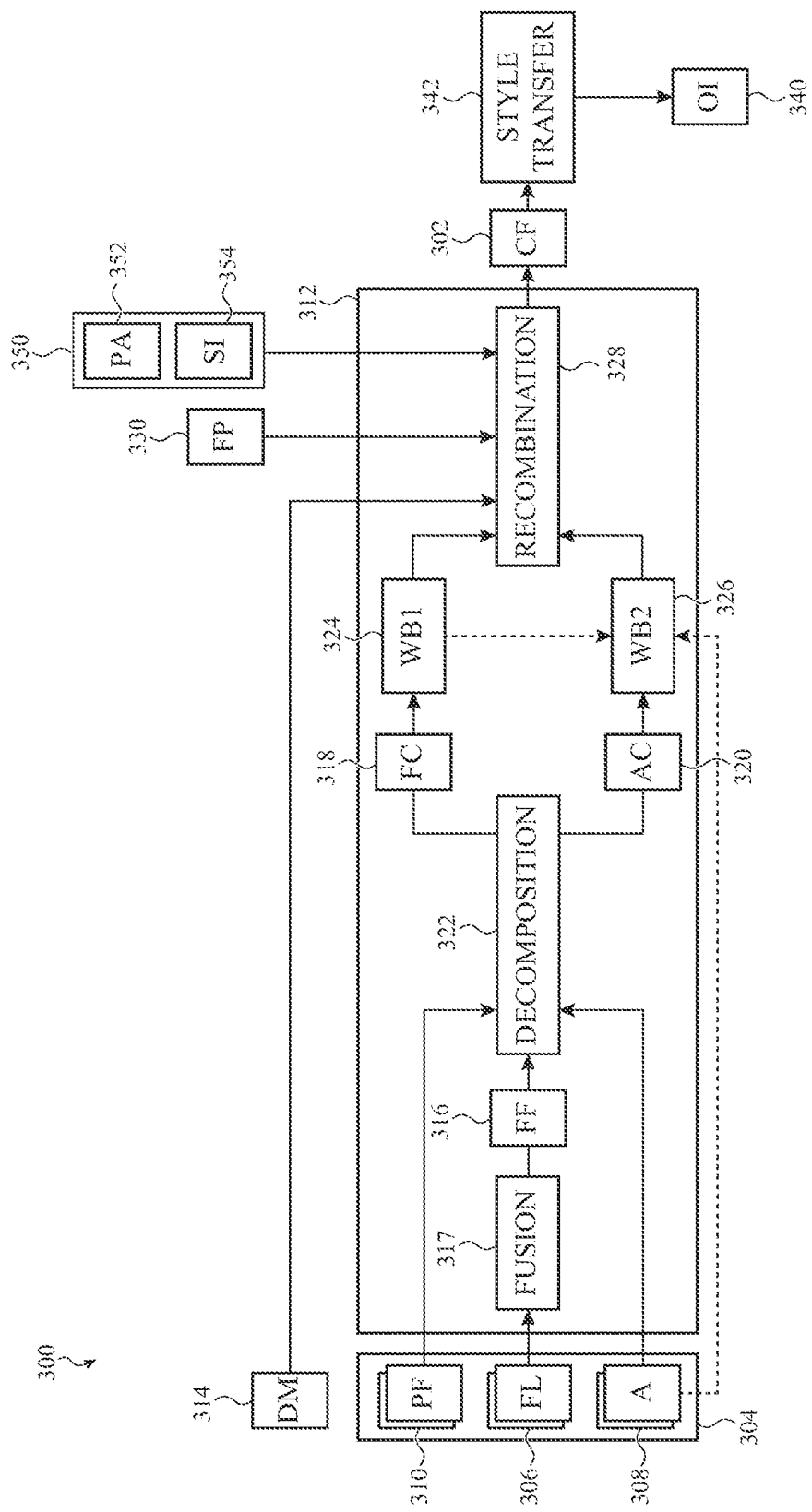
FIG. 3 depicts a process of correcting a flash image as described herein.

FIG. 3 depicts an overview of a process 300 of generating a corrected flash image 302. The steps of process 300 may be performed as a method, or may be stored as instructions on a non-transitory computer-readable storage device, such that a processor may utilize these instructions to perform the various steps of the processes described herein. Similarly, the devices described herein include a memory (e.g., memory 138) and one or more processors (e.g., processor 136) operatively coupled to the memory, where the one or more processors are configured to execute instructions that cause the one or more processors to perform the steps of process 300.

Specifically, the process 300 obtains a set of images 304 of a scene that includes a set of flash images 306 and a set of ambient images 308. In some instances, the set of images also includes a set of pre-flash images 310. Additionally or alternatively, the set of images also includes a transition image (not shown). At step 312, the set of images is used to generate the corrected flash image 302, as will be described in more detail below. Some or all of the set of images may be captured in response to a capture request as discussed above with respect to FIG. 2.

Additionally, the process 300 also includes obtaining a depth map 314, wherein the depth map 314 is used in step 312 to generate the corrected flash image 302. The depth map 314 includes a matrix of pixels, where each pixel corresponds to a respective location in the scene and has a respective depth value representing a distance between a device (or a portion thereof, such as the flash module) and the respective location in the scene. In some instances, the depth map 314 may be derived from depth information generated by a depth sensor in instances where the device includes a depth sensor (e.g., a front-facing depth sensor 106 or a rear-facing depth sensor 114 of the device 100 of FIGS. 1A-1B). Additionally or alternatively, the depth map 314 may be derived from image analysis of an image captured by a camera of the device, such as one of the set of images. In these instances, the image may be analyzed using monocular depth estimation techniques to estimate depth information for different portions of the scene.

Generally, step 312 includes decomposing an input image into a flash contribution image 318 and an ambient contribution image 320. The flash contribution image 318 and the ambient contribution image 320 are then recombined to generate the corrected flash image 302. The recombination uses the depth map 314 and optionally other information to guide the relative contributions of the flash contribution image 318 and the ambient contribution image 320 in generating the corrected flash image 302.

The input image is selected or generated from the set of flash images 306. Because a flash image is illuminated by a mixture of ambient illumination and flash illumination, it is possible to estimate the relative contributions of the ambient illumination and the flash illumination to the input image. Accordingly, each pixel of the input image may be divided into a flash value (representing the flash illumination's contribution to the pixel) and an ambient value (representing the flash illumination's contribution to the pixel). The flash values are used as pixel values to generate the flash contribution image 318, and thus the flash contribution image 318 represents the portion of the input image that was illuminated with flash illumination. Similarly, the ambient values are used as pixel values to generate the ambient contribution image 320, and thus the ambient contribution image represents the portion of the input image that was illuminated with flash illumination.

Returning to FIG. 3, step 312 includes a decomposition operation 322 that decomposes the input image to generate the flash contribution image 318 and the ambient contribution image 320. In some variations, the process includes selecting the input image from the set of flash images 306, such that input image is one of the set of flash images 306. In other variations, the process includes selecting a fused flash image 316 as the input image, where the fused flash image 316 is generated from two or more flash images from the set of flash images 306. In these variations, step 312 includes an image fusion operation 317 that generates the fused flash image 316. In the image fusion operation 317, the process 300 combines two or more flash images using an image fusion algorithm, which can be any suitable technique for generating a high dynamic range (HDR) image. In some instances, the image fusion operation 317 includes registering the two or more flash images. The fused flash image 316 has a higher dynamic range than the individual flash images used to generate the fused flash image 316, which may allow for recovery of saturated areas in flash images with relatively longer exposure times.

The decomposition operation 322 includes selecting a reference image, and decomposing the fused flash image, using the reference image, to generate the flash contribution image 318 and the ambient contribution image 320. Specifically, the reference image may be one of the set of images 304 or generated from one or more of the set of images 304. In some instances, the reference image is an ambient image selected from the set of ambient images 308. In some instances, the process selects a predetermined ambient image from the set of ambient images 308 (e.g., an ambient image that has a predetermined relationship to the set of flash images 306 in an image stream, such as an ambient image captured at a particular time relative to the main flash phase).

In other instances, the process dynamically selects an ambient image from the set of ambient images 308 based on a set of criteria. For example, in some instances the process selects an ambient image from the set of ambient images 308 that is determined to have the least amount of motion between it and the input image (either across the whole scene or a portion thereof). If a person or object in the scene is moving as the set of images 304 is captured, the reference image may be selected to reduce the impact of this motion between the reference image and the input image. For example, the process for selecting the ambient image may generate a commonality metric for each of the ambient images, where the commonality metric represents a measure of similarity between the ambient image and the input image. The ambient image with the highest commonality metric may be selected as the reference image. In other embodiments, two or more ambient images from the set of ambient images 308 may be fused to generate the reference image.

In other embodiments, the reference image is a pre-flash image selected from the set of pre-flash images 310 instead of an ambient image. The process may select a predetermined pre-flash image from the set of pre-flash images 310 or may dynamically select a pre-flash image from the set of pre-flash images 310 using a set of criteria (such as discussed immediately above with respect to the set of ambient images 308). Alternatively, two or more pre-flash images 310 may be fused to generate the reference image.

In still other embodiments, the reference image may be selected from a group of images that includes pre-flash images (e.g., one or more of the set of pre-flash images 310) and ambient images (e.g., one or more of the set of ambient images 308). In these instances, one or more criteria may be applied to the group of images to select the reference image therefrom. Depending on the scene conditions, the reference image may be a pre-flash image in some contexts and may be an ambient image in other contexts. This may provide a wider range of options in selecting the reference image.

In order to generate the flash contribution image 318 and the ambient contribution image 320 from the input image, the process compares the pixel values from the candidate and reference images to estimate the relative contributions of flash illumination and ambient illumination to the input image. Depending on the selected candidate and reference images, pixel values for one or both of the images may be adjusted to account for different exposure levels between the input image and the reference image. Additionally or alternatively, the decomposition operation 322 may include registering the reference image and the input image. These exposure adjustments and registration operations may improve the accuracy of the decomposition operation 322.

The reference image and the input image may be compared in any suitable manner to generate the flash contribution image 318 and the ambient contribution image 320. When the reference image is an ambient image, taking a normalized ratio or a weighted difference between a pixel value from the reference image and a corresponding pixel value from the input image can be used as an estimate of the relative contributions of the ambient illumination and the flash illumination. These ratios or differences may be applied to the pixel values of the input image to generate the flash contribution image 318 and the ambient contribution image 320. When the reference image is a pre-flash image, the decomposition operation 322 may utilize information about the flash intensity used to generate the input image (e.g., the second flash intensity 224 shown in FIG. 2), and the flash intensity used to generate the reference image (e.g., the first flash intensity 222 shown in FIG. 2). By assuming the ambient illumination does not vary between the reference and input images, the ambient contribution to the input image can be derived using this information.

Once the flash contribution image 318 and the ambient contribution image 320 have been generated, the process may include performing white balancing operations on one or both of these images. For example, the process 300 may include performing a first white balancing operation 324 on the flash contribution image 318 to generate a color-corrected flash contribution image. In these variations, because the flash contribution image 318 represents an estimation of the contributions of the flash illumination only, it can be treated as if there is no ambient illumination present. The device may know color information of the flash illumination provided by the flash module during capture of the set of flash images 306 (e.g., the flash module may emit light at a predetermined color temperature during the main flash phase), which may create a color cast in the flash contribution image 318. Accordingly, the first white balancing operation 324 uses the color temperature of the flash illumination in performing the first white balancing operation 324. The first white balancing operation 324 may be any suitable white balancing technique that corrects for a known illuminant, as will be readily understood by someone of ordinary skill in the art.

Additionally or alternatively, the process includes performing a second white balancing operation 326 on the ambient contribution image 320 to generate a color-corrected ambient contribution image. Because the source or sources of the ambient illumination may not be known, the second white balancing operation 326 may be a different technique than the first white balancing operation 324 (which is assumed to have a known illuminant). The second white balancing operation 326 may utilize any suitable white balancing techniques that are used to account for ambient illumination in an image. In some variations, such as described below in FIG. 4, the second white balancing operation 326 may utilize the color-corrected flash contribution image 318 generated by the first white balancing operation 324.

A recombination operation 328 combines the flash contribution image 318 and the ambient contribution image 320 to generate the corrected flash image 302. The recombination operation 328 obtains the depth map 314, and uses the depth map 314 to perform depth-based adjustments to the flash contribution image 318. In some variations, the recombination operation 328 obtains a flash intensity profile 330, and uses the flash intensity profile 330 (alone or in combination with other information such as the depth map 314) to perform the spatially-varying brightness adjustments to the flash contribution image 318. These adjustments will alter the relative contribution of the flash contribution image 318 in generating the corrected flash image 302, which allows the process 300 to correct for flash-based brightness variations discussed herein. Additionally or alternatively, the recombination operation 328 obtains contextual information 350 about the scene, and uses the contextual information 350 to adjust how the flash-based brightness variations are corrected in generating the corrected flash image 302. The contextual information 350 may include preference adjustment information 352 and/or a scene information map 354.

The recombination operation 328, the flash intensity profile 330, and the contextual information 350 are described below with respect to FIG. 5.

It should be appreciated that some or all of the various operations included in step 312 may be performed at the same resolution as the set of images 304 that are used to generate the corrected flash image 302, or may be performed at a different resolution. For example, in some instances the process 300 down samples the input image and any other images of the set of images 304 used by the decomposition operation 322, the first white balancing operation 324, the second white balancing operation 326, and the recombination operation 328. These images may be downsampled to a common resolution. Similarly, the depth map 314 may be downsampled or upsampled to the common resolution if needed. In this way, any images generated from the input image are generated at this common resolution. Performing the operations of step 312 at lower resolutions may make the processing faster and less sensitive to registration and motion artifacts.

In some instances, the process 300 includes selecting a source image, and using a style transfer operation 342 to generate an output image 340 using the corrected flash image 302 and the source image. Specifically, the style transfer operation 342 may receive a source image and a target image, and is designed to extract an artistic style of the target image and apply it to the source image to create a stylized version of the source image. The style transfer operation 342 may use any suitable style transfer techniques as will be readily understood by one of ordinary skill in the art. In these instances, the corrected flash image 302 may be the target image. The input image discussed previously (e.g., one of the set of flash images 306 or a fused flash image 316) may be the source image, such that the corrected flash image is used to create a stylized version of the input image. This stylized version may effectively receive the brightness corrections of the corrected flash image 302, but may mitigate the impact of artifacts that may be introduced into the corrected flash image 302 by virtue of any of the operations of step 312. Additionally, in instances where a downsampled version of the input image is used to generate a lower resolution corrected flash image 302, the style transfer operation 342 allows the brightness corrections of the corrected flash image 302 to be applied to the higher resolution version of the input image. This effectively generates an upsampled version of the corrected flash image. The process may output the output image 340 for viewing by a user or use by an application, and/or may be used in additional operations to generate additional images.

Figure 4:
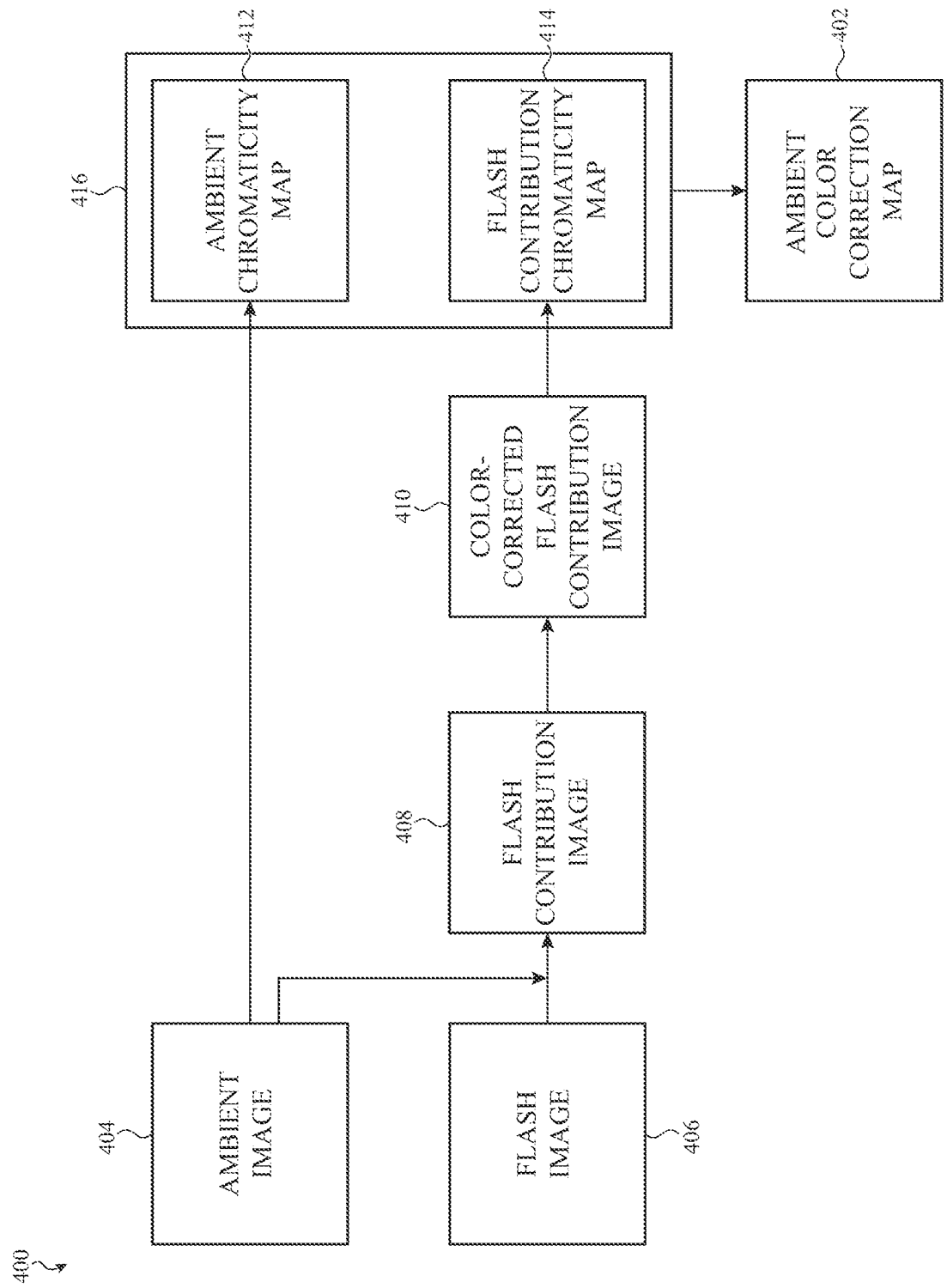
FIG. 4 depicts an example of a recombination operation that utilizes spatially-varying brightness adjustments as described herein.

FIG. 4 shows a portion of a white balancing operation 400 that generates an ambient color correction map 402 for use in color correcting an image. For example, the second white balancing operation 326 described above with respect to FIG. 3 may utilize the white balancing operation 400 to generate the ambient color correction map 402. The ambient color correction map 402 includes a matrix of pixels, where each pixel corresponds to a respective location in the scene and has an estimated white point of the respective location in the scene.

Specifically, the white balancing operation 400 obtains an ambient image 404 and a color-corrected flash contribution image 410 that is generated using a flash image 406. The ambient image 404 may be selected or generated from the set of ambient images 308 as described above, while the color-corrected flash contribution image 410 may be generated in any manner as described above. For example, the ambient image 404 and the flash image 406 may be the reference and input images used by decomposition operation 322 described above with respect to FIG. 3. The ambient image 404 and the flash image 406 may be used to generate a flash contribution image 408 using any of the decomposition operation 322 described above with respect to FIG. 3. For example, the flash contribution image 408 in white balancing operation 400 may be the flash contribution image 318 generated by the decomposition operation 322 in process 300.

Similarly, the flash contribution image 408 may be color corrected using a separate white balancing operation to generate the color-corrected flash contribution image 410. Because the flash contribution image 408 represents an estimation of the contributions of flash illumination only, color information corresponding to the illumination provided by the flash module may be used in the separate white balancing operation to color correct the flash contribution image 408. For example, in some instances the color-corrected flash contribution image 410 is the output of the first white balancing operation 324 in process 300.

The white balancing operation 400 includes a map-generating operation 416 that generates an ambient color correction map 402 using the ambient image 404 and the color-corrected flash contribution image 410. Specifically, the map-generating operation 416 includes generating an ambient chromaticity map 412 from the ambient image 404, and a flash contribution chromaticity map 414 from the color-corrected flash contribution image 410. The ambient chromaticity map 412 includes a matrix of pixels, where each pixel includes a chromaticity value derived from a pixel (or set of pixels) of the ambient image 404. Similarly, the flash contribution chromaticity map 414 includes a matrix of pixels, where each pixel includes a chromaticity value derived from a pixel (or set of pixels) of the color-corrected flash contribution image 410.

Because the color-corrected flash contribution image 410 is intended to represent flash illumination only, the flash contribution chromaticity map 414 represents that chromaticity of the scene without any ambient illumination. Conversely, the ambient chromaticity map 412 represents the chromaticity of the scene with the ambient illumination. By comparing a given pixel of the ambient chromaticity map 412 to a corresponding pixel of the flash contribution chromaticity map 414, a white point of the ambient illumination at a corresponding portion of the scene may be calculated. Accordingly, the ambient color correction map 402 may include a matrix of pixels, where each pixel includes a white point value derived from a corresponding pixel from the ambient chromaticity map 412 and a corresponding pixel from the flash contribution chromaticity map 414. The ambient color correction map 402 may be used to color correct another image (e.g., the ambient contribution image 320 in the second white balancing operation 326 of process 300).

Figure 5:
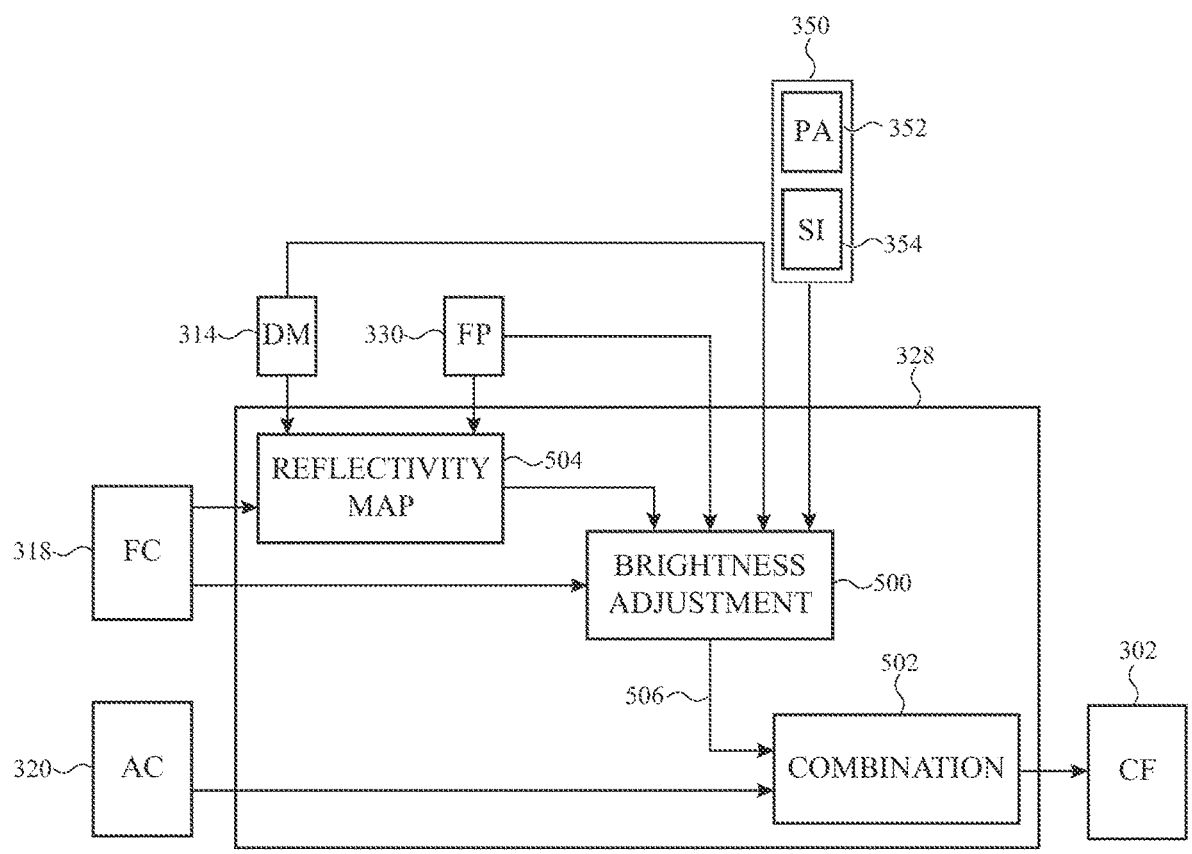
FIG. 5 depicts an example of a white balancing operation as described herein.

FIG. 5 shows a variation of the recombination operation 328 of process 300. As shown there, the recombination operation 328 receives as inputs the flash contribution image 318 (which in some instances may be color corrected using a first white balancing operation) and the ambient contribution image 320 (which in some instances may be color corrected using a second white balancing operation). The recombination operation 328 includes a brightness adjustment step 500 that modifies brightness values for some or all of the pixels of flash contribution image 318 to generate a brightness-adjust flash contribution image 506 (represented by output of brightness adjustment step 500 in FIG. 5). The brightness-adjusted flash contribution image 506 is then combined with ambient contribution image 320 to generate the corrected flash image 302.

The brightness adjustment step 500 accordingly controls the relative contribution of the flash contribution image 318 to the brightness of each pixel of the corrected flash image 302. For example, the brightness adjustment step 500 may include calculating a set of brightness adjustment values, where each adjustment value is associated with a corresponding pixel of the flash contribution image 318. The brightness adjustment values may be applied to the flash contribution image 318 to perform the spatially-varying brightness adjustment and generate the brightness-adjusted flash contribution image 506. Specifically, the brightness of each pixel of the flash contribution image 318 may be modified using a corresponding brightness adjustment value to generate the brightness-adjusted flash contribution image 506.

In some variations, the brightness adjustment step 500 spatially adjusts the brightness of the flash contribution image using the depth map 314. Because the intensity of the illumination provided by the flash module decreases as a function of the distance from the flash module, it may be desirable to provide a stronger adjustment to portions of the scene that are closer to the flash module (since they will have received stronger flash illumination during capture of the flash images). Accordingly, in instances where the brightness adjustment step 500 includes calculating a set of brightness adjustment values, each brightness adjustment value is calculated using a corresponding depth value. In these instances, lower depth values that indicate portions of the scene closer to the flash module will receive a greater adjustment as compared to higher depth values that indicate portions of the scene positioned further from the flash module.

Additionally or alternatively, the brightness adjustment step 500 spatially adjusts the brightness of the flash contribution image using the flash illumination profile 330 associated with the flash module (or modules) that provided the flash illumination while capturing the flash images. Specifically, the flash illumination profile 330 includes a matrix of pixels, where each pixel corresponds to a respective location in the scene and has a respective spatial intensity value representing a relative spatial intensity of the flash illumination provided to the respective location in the scene. Depending on the flash module, the illumination provided by the flash module may not be uniform across a field of illumination of the flash module. For example, an object in the scene that is positioned at the corners of an image may receive less illumination as a function of depth as compared to another object positioned closer to the center of the image. Accordingly, each brightness adjustment value may be calculated using a corresponding spatial intensity value. For example, the selection of the brightness adjustment values may depend on both the depth values from a depth map 314 and, in some instances, the spatial intensity values from the flash illumination profile 330.

It should be appreciated that a given flash module may be associated with multiple candidate flash illumination profiles. In these instances, one of the candidate flash illumination profiles may be selected for use in the brightness adjustment operation. Each candidate flash illumination profile may be associated with a particular operating mode of the flash module and/or a set of scene conditions. For example, in some instances a flash module may include multiple individually-controllable light sources, and the spatial intensity of the flash may vary depending on which of these light sources are providing illumination as well as the relative illumination intensity of these light sources. Similarly, an image taken with an object positioned very close to a flash module may receive a different spatial intensity as compared to situations in which there is larger separation between the flash module and the scene. Accordingly, selecting a flash illumination profile from a set of candidate flash illumination profiles helps improve the accuracy of the brightness adjustments across a range of situations.

Additionally or alternatively, the brightness adjustment step 500 spatially adjusts the brightness of the flash contribution image using a reflectivity map 504 as shown in FIG. 5. Specifically, the reflectivity map 504 includes a matrix of pixels, where each pixel corresponds to a respective location in the scene and has a respective reflectivity value representing an albedo of the respective location in the scene. Specifically, different objects in a scene will reflect light differently based on its albedo. Objects that are highly reflective will reflect more of the flash illumination as compared to less reflective objects, resulting in the highly reflective objects being relatively overexposed. Accordingly, each brightness adjustment value may be calculated using a corresponding reflectivity value from the reflectivity map 504. For example, the selection of the brightness adjustment values may depend on the reflectivity values from the reflectivity map, and in some of these instances may also depend on the depth values from a depth map 314 and/or the spatial intensity values from the flash illumination profile 330.

The reflectivity map 504 may be calculated in any suitable manner. In the variation of the recombination operation 328 shown in FIG. 5, the reflectivity map 504 is calculated using the flash contribution image 318, the depth map 314, and information about the flash intensity used to capture the input image (e.g., flash intensity associated with a flash module or modules). In some instances, the reflectivity map 504 is also calculated using a flash illumination profile 330 as discussed previously. The expected intensity of light returned from a certain location in the scene is a function of the intensity of light that reached that location and the albedo of that scene at that location. The intensity of light that reached a given location of the scene may be calculated from the flash intensity information, a corresponding spatial intensity value from the flash illumination profile 330, and a corresponding depth value from the depth map 314. This calculated intensity may be compared to the brightness of a corresponding pixel of the flash contribution image 318 in order to determine the albedo (and thus the reflectivity value) for that location in the scene.

Additionally or alternatively, the brightness adjustment step 500 spatially adjusts the brightness of the flash contribution image using contextual information 350 about the scene. Specifically, the contextual information 350 includes information about the content of the scene captured by the input image (and/or any of the set of images 304). For example, the contextual information 350 may include a scene information map 354. Specifically, the scene information map 354 includes a matrix of pixels, where each pixel corresponds to a respective location in the scene and has a respective identifier indicating the type of object present at that location (and optionally, a confidence value associated with the identifier). For example, a scene information map 354 may be configured to identify locations of the scene that include human faces, such that each pixel of the scene information map indicates whether a face is present at the respective location in the scene, or includes a value (such as a normalized value between zero and one) representing the confidence that a face is present at the respective location the scene. In some variations, the contextual information 350 may include multiple scene information maps (each of which is associated with a different type of object), or may include a since scene information map 354 that may indicate the presence of multiple types of objects (e.g., people, animals, trees, or the like) in the scene.

Specifically, the scene information map 354 (or maps) may provide an understanding of the content of the scene, and the brightness adjustment step 500 may alter the brightness adjustments based on the content of the scene. For example, the brightness adjustment step 500 may be configured to provide a different adjustment to people in the scene as compared to other objects present in the scene. In these instances, the brightness adjustment step 500 may utilize a depth map 314, a reflectivity map 504, and/or a flash illumination profile 330 to calculate a set of brightness adjustment values as discussed above, and may further adjust some or all of these brightness adjustment values depending on which portions of the scene are determined to include a person. Accordingly, two objects positioned at the same distance from the camera may receive different brightness adjustments based on their respective object types.

The scene information map 354 may be generated in any suitable manner. For example, some or all of the set of images 304 and/or the depth map 314 may be analyzed, such as using image segmentation and/or image classification techniques as will be readily understood by someone of ordinary skill in the art. These techniques may be used to look for a set of predetermined objects within the scene, the selection of which may be set based on user preferences, a photography mode that is active when the set of images 304 is captured, and/or a desired effect selected by the user that will applied to generate an output image. In some variations, the scene information map 354 may be based, at least in part, on user input. For example, the user may identify a region of interest of the scene (e.g., by touching a touch-sensitive component of a display that is displaying a live preview or a preview image generated from the set of images 304), and one or more objects may be identified in the region of interest to generate a scene information map 354.

Additionally or alternatively, the contextual information 350 may include preference adjustment information 352, which may allow the user to set parameters for altering the brightness adjustment performed by brightness adjustment step 500. The preference adjustment information 352 may include one or more parameters for how the brightness adjustment step 500 calculates the set of brightness adjustment values using the scene information map 354. For example, in the instance discussed above where the brightness adjustment step 500 is configured to provide a different brightness adjustment to portions of the scene that include people, the preference adjustment information 352 may determine the magnitude of the adjustment for these portions. For example, a user may wish to increase the relative brightness of people in the scene, thus may provide an input that alters the preference adjustment information 352.

Overall, the preference adjustment information 352 may allow the user to apply a range of effects in generating the brightness-adjusted flash contribution image 506 (and thereby the corrected flash image 302). In some instances, the user may select between a number of photography modes, such that the set of images 304 is captured while a given photography mode is selected. In these instances, default preference adjustment information 352 is selected based on the selected photography mode. Additionally or alternatively, the user may select a desired effect or otherwise manually adjust certain settings that may alter the preference adjustment information 352.

Returning to FIG. 5, the ambient contribution image 320 and the brightness-adjusted flash contribution image 506 may be combined to form the corrected flash image 302 at step 502. This combination step may involve combining pixel values from the flash contribution image 318 with pixel values from the ambient contribution image 320 according to a predetermined relationship to generate the pixel values of the corrected flash image 302. In some variations, the corrected flash image 302 may undergo an additional white balancing operation (e.g., a third white balancing operation). This additional white balancing operation may be used to apply a desired color adjustment to the corrected flash image 302.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An image processing method, comprising:
obtaining a set of images from a set of cameras, the set of images comprising a set of flash images;
generating a fused flash image from two or more flash images of the set of flash images;
decomposing the fused flash image using a reference image to generate a flash contribution image and an ambient contribution image;
performing a spatially-varying brightness adjustment to the flash contribution image; and
recombining the brightness-adjusted flash contribution image and the ambient contribution image to generate a corrected flash image.

2. The method of claim 1, comprising:
selecting a source image; and
using a style transfer operation to generate an output image from the corrected flash image and the source image.

3. The method of claim 2, wherein:
the source image is the fused flash image.

4. The method of claim 1, wherein:
the set of images comprises a set of ambient images; and
the reference image is selected or generated from the set of ambient images.

5. The method of claim 1, wherein:
the set of images comprises a set of pre-flash images; and
the reference image is selected or generated from the set of pre-flash images.

6. The method of claim 1, wherein:
performing the spatially-varying brightness adjustment comprises spatially adjusting the brightness of the flash contribution image using a depth map.

7. The method of claim 1, wherein:
performing the spatially-varying brightness adjustment comprises spatially adjusting the brightness of the flash contribution image using a reflectivity map.

8. The method of claim 1, wherein:
performing the spatially-varying brightness adjustment comprises spatially adjusting the brightness of the flash contribution image using a flash illumination profile.

9. The method of claim 1, comprising:
performing a first white balancing operation to color correct the flash contribution image; and
performing a second white balancing operation to color correct the ambient contribution image.

10. The method of claim 9, wherein:
the second white balancing operation uses the color-corrected flash contribution image to generate a color correction map.

11. The method of claim 1, wherein:
performing the spatially-varying brightness adjustment comprises spatially adjusting the brightness of the flash contribution image using contextual information about a scene captured by the set of images.

12. A device comprising:
a set of cameras;
a flash module;
a memory; and
one or more processors operatively coupled to the memory, wherein the one or more processors are configured to execute instructions causing the one or more processors to:
  obtain a set of images from the set of cameras, the set of images comprising a set of flash images;
  obtain a depth map;
  select or generate a reference image from the set of images;
  select or generate an input image from the set of flash images;
  decompose the input image using the reference image to generate a flash contribution image and an ambient contribution image;
  perform a spatially-varying brightness adjustment to the flash contribution image using the depth map; and
  recombine the brightness-adjusted flash contribution image and the ambient contribution image to generate a corrected flash image.

13. The device of claim 12, comprising a depth sensor, wherein:
obtaining the depth map comprises deriving the depth map from depth information generated by the depth sensor.

14. The device of claim 12, wherein:
performing the spatially-varying brightness adjustment comprises performing the spatially-varying brightness adjustment using a flash illumination profile associated with the flash module.

15. The device of claim 14, wherein:
the flash illumination profile is selected from a set of candidate flash illumination profiles.

16. The device of claim 12, wherein:
performing the spatially-varying brightness adjustment comprises performing the spatially-varying brightness adjustment using contextual information about a scene captured by the set of images.

17. The device of claim 12, wherein:
the set of images comprises a set of ambient images; and
the reference image is selected or generated from the set of ambient images.

18. A device comprising:
a set of cameras;
a flash module;
a memory; and
one or more processors operatively coupled to the memory, wherein the one or more processors are configured to execute instructions causing the one or more processors to:
  obtain a set of images from the set of cameras, the set of images comprising a set of flash images;
  select or generate an input image from the set of flash images;
  select or generate a reference image from the set of images;
  decompose the input image using the reference image to generate a flash contribution image and an ambient contribution image;
  perform a spatially-varying brightness adjustment to the flash contribution image using a reflectivity map; and
  recombine the brightness-adjusted flash contribution image and the ambient contribution image to generate a corrected flash image.

19. The device of claim 18, wherein the one or more processors are configured to execute the instructions causing the one or more processors to:
obtain a depth map; and
generate the reflectivity map using the flash contribution image and the depth map.

20. The device of claim 19, wherein:
generating the reflectivity map comprises generating the reflectivity map using a flash illumination profile associated with the flash module.

21. The device of claim 18, wherein:
the input image is a fused flash image generated from two or more flash images of the set of flash images.

22. The device of claim 18, wherein the one or more processors are configured to execute the instructions causing the one or more processors to:
down sample the input image.

* * * * *